US012565101B2

(12) United States Patent
Kangutkar

(10) Patent No.: US 12,565,101 B2
(45) Date of Patent: Mar. 3, 2026

(54) WINDSHIELD AND VISIBILITY IMPROVEMENTS FOR DRIVERS IN ADVERSE WEATHER AND LIGHTING CONDITIONS

(71) Applicant: Torc Robotics, Inc., Blacksburg, VA (US)

(72) Inventor: Rasika Kangutkar, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 140 days.

(21) Appl. No.: 18/411,475

(22) Filed: Jan. 12, 2024

(65) Prior Publication Data

US 2025/0229630 A1      Jul. 17, 2025

(51) Int. Cl.
| | |
|---|---|
| *B60K 35/22* | (2024.01) |
| *B60K 35/65* | (2024.01) |
| *G06T 5/50* | (2006.01) |
| *G06T 11/00* | (2006.01) |

(52) U.S. Cl.
CPC .......... *B60K 35/223* (2024.01); *B60K 35/654* (2024.01); *G06T 5/50* (2013.01); *G06T 11/00* (2013.01); *B60K 2360/785* (2024.01)

(58) Field of Classification Search
CPC ................ B60K 35/223; B60K 35/654; B60K 2360/785
See application file for complete search history.

(56) References Cited

U.S. PATENT DOCUMENTS

| | | | | |
|---|---|---|---|---|
| 4,921,299 | A * | 5/1990 | Herrick .................. | B60J 1/2077 |
| | | | | 160/370.22 |
| 5,001,558 | A | 3/1991 | Burley et al. | |
| 7,227,515 | B2 | 6/2007 | Kormos | |
| 7,433,496 | B2 | 10/2008 | Ishii et al. | |
| 9,654,687 | B2 * | 5/2017 | Varonos .................... | B60R 1/28 |
| 9,809,165 | B1 | 11/2017 | Misu et al. | |
| 9,848,173 | B1 | 12/2017 | Pertsel et al. | |
| 10,875,403 | B2 | 12/2020 | Van Dan Elzen et al. | |
| 2002/0067413 | A1 | 6/2002 | McNamara | |
| 2006/0151223 | A1 | 7/2006 | Knoll | |
| 2006/0157639 | A1 | 7/2006 | Shaffer et al. | |
| 2013/0194426 | A1 * | 8/2013 | Schofield .................. | B60R 1/23 |
| | | | | 348/148 |

FOREIGN PATENT DOCUMENTS

| | | | | |
|---|---|---|---|---|
| EP | | 3379317 A1 * | 9/2018 | ............... G02B 9/62 |

* cited by examiner

*Primary Examiner* — Xiao M Wu
*Assistant Examiner* — Ahmed Taha
(74) *Attorney, Agent, or Firm* — Armstrong Teasdale LLP

(57) ABSTRACT

A vehicle including a windshield, a flexible display screen, a flexible display screen attachment component, at least one processor, and at least one memory configured to store instructions is disclosed. The instructions, when executed by the at least one processor, cause the at least one processor to (i) generate a set of images from sensor data received from one or more sensors mounted on a body of the vehicle; and (ii) display the set of images on the flexible display screen attached to the flexible display screen attachment component while covering the windshield. The set of images has effects of adverse weather conditions or poor lighting conditions removed.

20 Claims, 7 Drawing Sheets

200

500

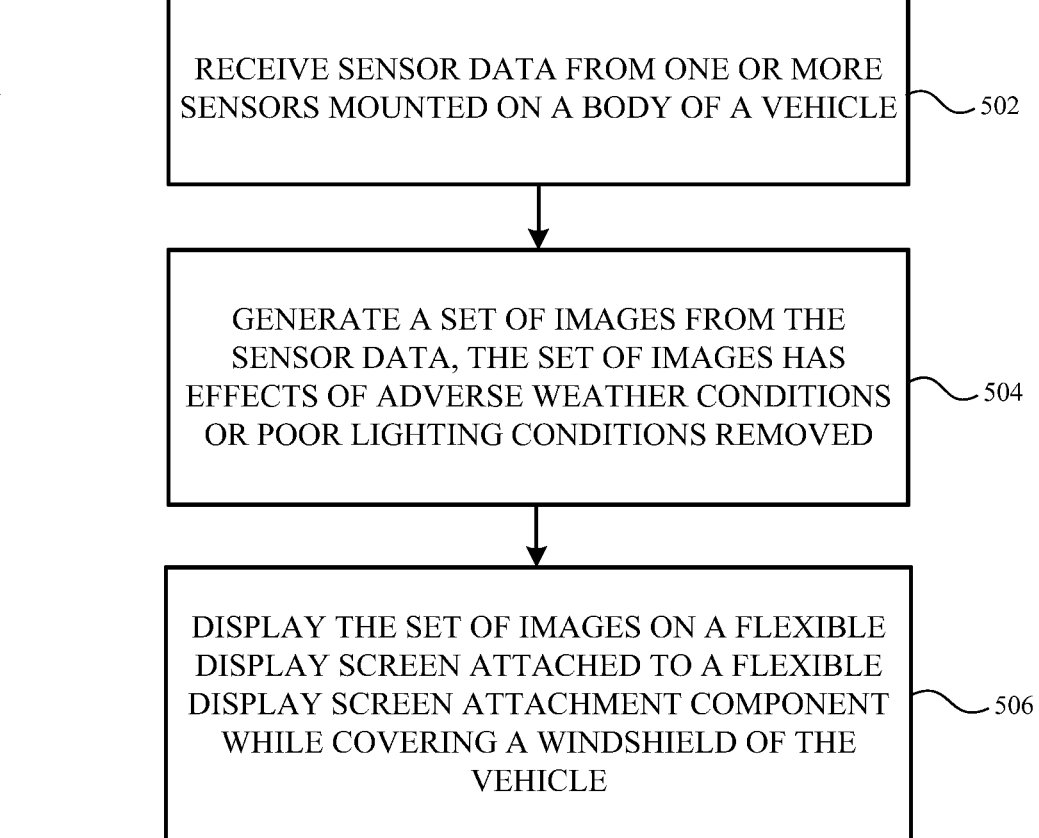

RECEIVE SENSOR DATA FROM ONE OR MORE SENSORS MOUNTED ON A BODY OF A VEHICLE ~ 502

GENERATE A SET OF IMAGES FROM THE SENSOR DATA, THE SET OF IMAGES HAS EFFECTS OF ADVERSE WEATHER CONDITIONS OR POOR LIGHTING CONDITIONS REMOVED ~ 504

DISPLAY THE SET OF IMAGES ON A FLEXIBLE DISPLAY SCREEN ATTACHED TO A FLEXIBLE DISPLAY SCREEN ATTACHMENT COMPONENT WHILE COVERING A WINDSHIELD OF THE VEHICLE ~ 506

FIG. 5

WINDSHIELD AND VISIBILITY IMPROVEMENTS FOR DRIVERS IN ADVERSE WEATHER AND LIGHTING CONDITIONS

TECHNICAL FIELD

The field of the disclosure relates generally to vehicles and, more specifically, windshield and visibility improvements for drivers in adverse weather and lighting conditions.

BACKGROUND OF THE INVENTION

According to the U.S. Department of Transportation Federal Highway Administration, each year about 38,700 crashes occur due to poor visibility, for example, due to fog, which results in over 600 fatalities and over 16,300 injuries. Similar to fog, rain also reduces visibility and causes accidents. Additionally, in one study, it has been found that about forty-nine percent of fatal car accidents happen during night-time due at least in part to impaired vision at night, along with other factors. While adverse weather and poor visibility may make driving difficult, improving visibility may reduce crashes, fatalities, and injuries.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a vehicle including a windshield, a flexible display screen, a flexible display screen attachment component, at least one processor, and at least one memory configured to store instructions is disclosed. The instructions, when executed by the at least one processor, cause the at least one processor to (i) generate a set of images from sensor data received from one or more sensors mounted on a body of the vehicle; and (ii) display the set of images on the flexible display screen attached to the flexible display screen attachment component while covering the windshield. The set of images has effects of adverse weather conditions or poor lighting conditions removed.

In another aspect, a computer-implemented method is disclosed. The computer-implemented method includes receiving sensor data from one or more sensors mounted on a body of a vehicle and generating a set of images from the sensor data. The set of images has effects of adverse weather conditions or poor lighting conditions removed. The method includes displaying the set of images on a flexible display screen attached to a flexible display screen attachment component while covering a windshield of the vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 5 is a flow-chart of an example method being performed by the example driving system shown in FIG. 2.

Figure 1:
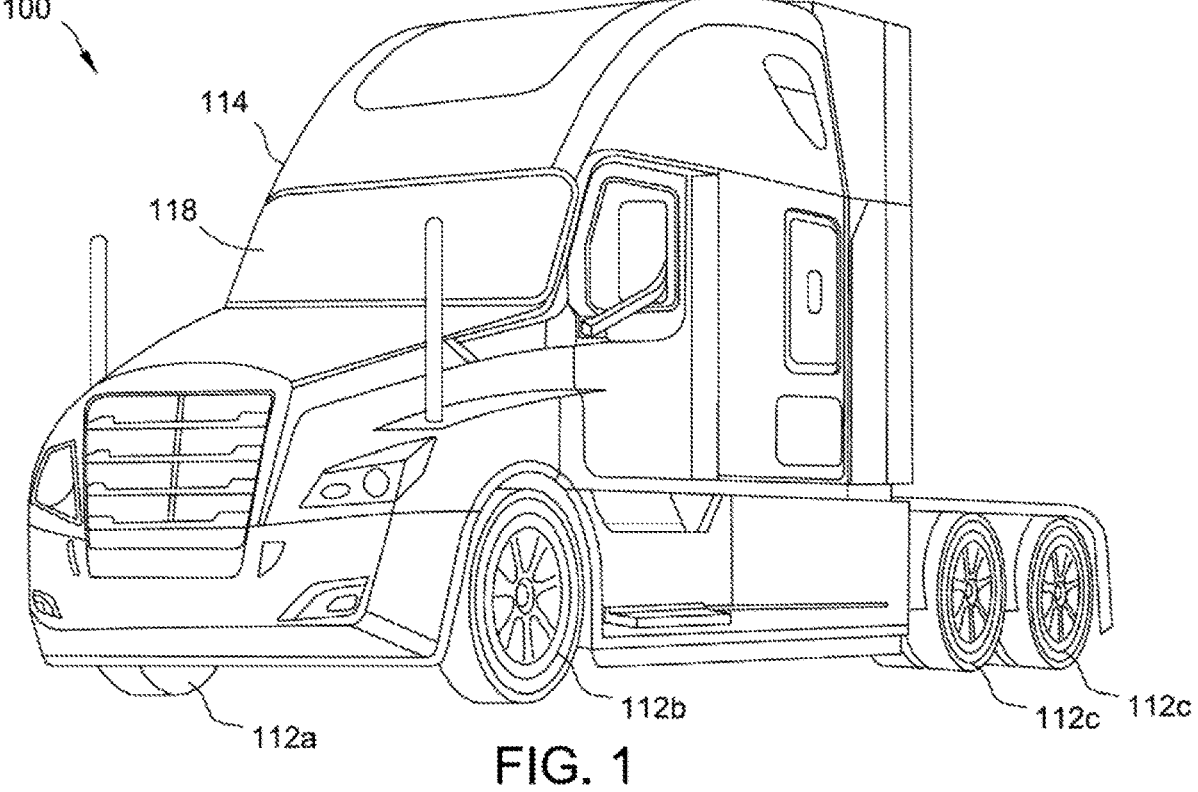
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA. The semi-autonomous vehicle requires a human driver for operating the semi-autonomous vehicle.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Various embodiments described herein are directed to a system that replaces a windshield or a windshield view that improves visibility during adverse weather conditions or poor lighting conditions including rain, fog, snow, night, etc. Improved visibility during adverse weather conditions or poor lighting conditions may make driving comfortable and safe. The vehicle may have a network of sensors mounted on a body of the vehicle. The network of sensors may include one or more cameras, one or more infrared sensors, one or more radio detection and ranging (RADAR) sensors, or one or more light detection and ranging (LiDAR) sensors, etc. Using sensor data collected from the network of sensors, the scene surrounding the vehicle may be transformed to a clear image in which effects of fog, rain, or poor lighting condition are removed. The clear image of the scene surrounding the vehicle may be shown on a windshield display device. The windshield display device is a display device that is used in place of a windshield and shows an image of the scene surrounding the vehicle as seen from a windshield of the vehicle. However, the image shown on the windshield display device is improved for visibility in which effects of fog, rain, poor light condition, etc., are removed. Additionally, or alternatively, various embodiments described herein may include overlaying (or projecting) map data on the windshield when the lighting condition is harsh or making lane lines difficult to see or showing (or projecting) animals or other road objects identified using perception technologies on the windshield to alert the driver.

In some embodiments, a framework for domain-adaptive object detection under adverse weather conditions or poor lighting conditions may be used in processing of visual data from the network of sensors. The visual data may include sensor data from one or more cameras, one or more LiDAR sensors, one or more RADAR sensors, or one or more infrared sensors, etc. The framework for domain-adaptive object detection may remove domain gap in images generated in adverse weather conditions or poor lighting conditions and images generated in clear weather. By way of a non-limiting example, the domain gap is removed at an image-level and an object-level using, for example, an adversarial gradient reversal layer that conducts adversarial mining on difficult instances in addition to domain adaptions. The framework may thus enhance robustness of object detection in adverse weather condition or poor lighting conditions, for example, due to rain, fog, or night.

In some embodiments, and by way of a non-limiting example, the framework may use unsupervised machine-learning models for reducing domain feature discrepancies in both image style and object appearance. Further, image-level and object-level domain classifiers may be used as components to convolutional neural network (CNN) for facilitating domain adaption. The image-level and object-level domain classifiers are responsible for distinguishing between different domains; however, by using an adversarial approach, the classifiers may generate the CNN to produce features that are agnostic to specific weather conditions, and thereby, improving object detection performance in adverse weather or poor lighting conditions.

In some embodiments, different adverse weather conditions may be applied to objects of a dataset to generate different synthetic datasets corresponding different adverse weather conditions including fog, rain, etc. The synthetic datasets are used for object detection based on integrated sensor data from sensors like cameras, RADAR sensors, or LiDAR sensors. Sensor data from LiDAR sensors or RADAR sensors may be used for obtaining object proposals or identifying regions of interest. In some embodiments, a domain adaption network may rely upon or utilize on sensor data from cameras only. Using the domain adaption framework, which is described in detail in "Domain Adaption based Enhanced Detection for Autonomous Driving in Foggy and Rainy Weather," by Jinlong Li, Runsheng Xu, Jin Ma, Qin Zou, Jiaqi Ma, and Hongkai Yu, and incorporated herein in its entirety, a set or stream of clear images may be generated, which is free from effects of adverse weather conditions or poor lighting conditions. The set or stream of clear images when displayed on a flexible windshield display screen may help improve windshield visibility to the driver.

The set or stream of clear images may be generated for display on the flexible windshield display screen using the network of sensors mounted in front of the vehicle to capture sensor data of an exterior scene from a driver's view. The network of sensors may include one or more cameras, one or more LiDAR sensors, or one or more RADAR sensors.

The network of sensors may be configured to collect sensor data for about 200-220° in a horizontal view from the driver's seat, about 60° above and about 75° below the driver's straight line of sight based on the driver's height. Accordingly, each sensor of the network of sensors may have its position adjusted based on the driver's height. The network of sensors may be mounted on a guiderail which may be adjusted to move up or down based on the driver's height as provided as an input to vehicle settings. Additionally, or alternatively, using an in-car sensor (e.g., an infrared led and a camera), the driver's height or height of line of sight for the driver may be determined and the network of sensors mounted on the guiderail may be adjusted to collect sensor data as specified herein.

Accordingly, various embodiments described herein provide improved windshield visibility to a driver of a vehicle. Various embodiments are discussed in more detail below with respect to FIGS. 1-5.

FIG. 1 illustrates a vehicle 100 that may further be conventionally connected to a single or tandem trailer to transport the trailers (not shown) to a desired location. The vehicle 100 includes a cabin 114 and can be supported by, and steered in, the required direction by front wheels 112a, and rear wheels 112c that are partially shown in FIG. 1. Wheels 112a, 112b are positioned by a steering system that includes a steering wheel and a steering column (not shown in FIG. 1). A windshield 118 may be a flexible windshield display screen configured to display a set or series of images showing an exterior view without effects from adverse weather conditions or poor lighting conditions due to, for example, fog, rain, etc.

A master control unit (MCU) (not shown in FIG. 1) of the vehicle 100 may receive data from a sensor network including one or more sensors such as cameras, acoustic sensors, infrared sensors, RADAR sensors, or LiDAR sensors, etc. The data received from the sensor network may be used for generating a set or series of images of an exterior view for the driver of the vehicle using a CNN for domain adaption. The domain adaption may be from foggy to clear, or rainy to clear, such that the driver of the vehicle may experience improved visibility in adverse weather conditions or poor lighting conditions. While the vehicle 100 shown in FIG. 1 is a truck or a tractor, the embodiments described herein may be applicable to any vehicle (e.g., a car, a boat, an airplane, etc.).

Figure 2:
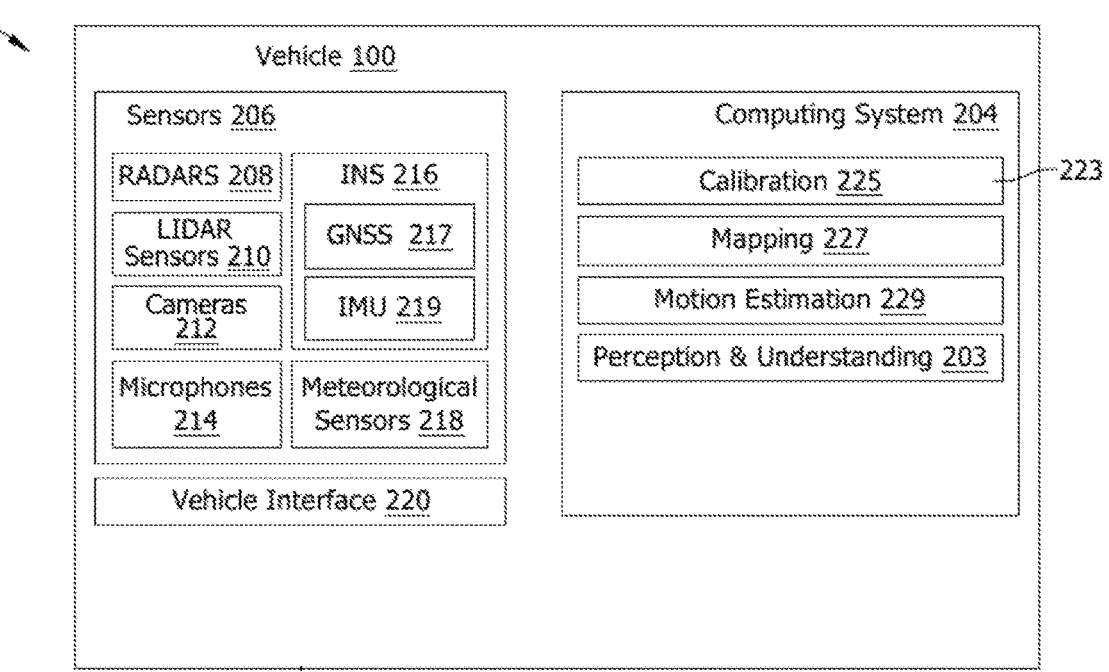
FIG. 2 is a block diagram of an example driving system.

FIG. 2 is a block diagram of a driving system 200 of a vehicle 100 (shown in FIG. 1).

In some embodiments, the vehicle 100 may include sensors 206. Sensors 206 may include RADAR devices 208, LiDAR sensors 210, cameras 212, and acoustic sensors 214. The sensors 206 may further include an inertial navigation system (INS) 216 configured to determine states such as the location, orientation, and velocity of the vehicle 100. The INS 216 may include at least one global navigation satellite system (GNSS) receiver 217 configured to provide positioning, navigation, and timing using satellites. The INS 216 may also include an IMU 219 configured to measure motion properties such as the angular velocity, linear acceleration, or orientation of the vehicle 100. The sensors 206 may further include meteorological sensors 218. Meteorological sensors 218 may include a temperature sensor, a humidity sensor, an anemometer, pitot tubes, a barometer, a precipitation sensor, or a combination thereof. The meteorological sensors 218 are used to acquire meteorological data, such as the humidity, atmospheric pressure, wind, or precipitation, of the ambient environment of vehicle 100.

The vehicle 100 may further include a vehicle interface 220, which interfaces with an engine control unit (ECU) (not shown) or a MCU (not shown) of vehicle 100 to control the operation of the vehicle 100 such as cruise control, in addition to display a set of series of images, generated as described herein, on the windshield display device 118 of vehicle 100. The vehicle interface 220 may be a controller area network (CAN) bus interface.

The vehicle 100 may further include a computing system 204. The computing system 204 may control vehicle operations of the vehicle 100 through the vehicle interface 220. The computing system 204 may perform operations to display of the set or series of images, generated as described herein, on the windshield display device 118. In some embodiments, the computing system 204 may include modules 223 for performing various functions. Modules 223 may include a calibration module 225, a mapping module 227, a motion estimation module 229, and perception and understanding module 203. Perception and understanding module 203 may be configured to analyze data from sensors 206 to generate the set or series of images using the CNN for domain adaptions, for example, from foggy to clear or rain to clear, as described herein. Modules 223 and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard the vehicle 100.

Various embodiments described herein for perceiving or identifying objects in the environment of the vehicle 100 may be implemented using the perception and understanding module 203. In some embodiments, based on the data collected from the sensors 206, the computing system 204 and, more specifically, perception and understanding module 203 senses the environment surrounding vehicle 100 by gathering and interpreting sensor data, as described herein, using the domain adaptation framework. The sensor data may be data collected from one or more cameras 212, one or more RADAR sensors 208, or one or more LiDAR sensors 210.

Mapping module 227 receives perception data that can be compared to one or more digital maps stored in mapping module 227 to determine where vehicle 100 is in the world or where vehicle 100 is on the digital map(s). In particular, mapping module 227 may receive perception data from perception and understanding module 203 or from the various sensors sensing the environment surrounding vehicle 100 and may correlate features of the sensed environment with details (e.g., digital representations of the features of the sensed environment) on the one or more digital maps. The digital map may have various levels of detail and can be, for example, a raster map, or a vector map. The digital maps may be stored locally on vehicle 100 or stored and accessed remotely. In at least one embodiment, vehicle 100 deploys with sufficient stored information in one or more digital map files such that no additional information may be needed from an external network.

In the example embodiment, based on the data collected from sensors 206, computing system 204 is configured to perform calibration, analysis, mapping, motion estimation, or perception and understanding operations of vehicle 100. For example, autonomy computing system 204 is configured to estimate the motion of vehicle 100, calibrate the sensors of vehicle 100, and provide a map of surroundings of vehicle 100 or the travel routes of vehicle 100.

Figure 3:
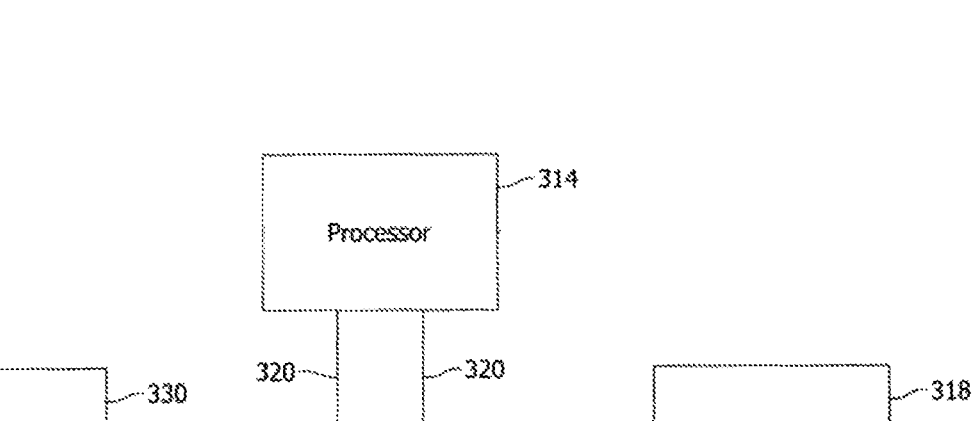
FIG. 3 is a block diagram of an example computing device.

Method operations described herein may be implemented on computing system 204, or more specifically on perception and understanding module 203. Additionally, or alternatively, the method operations may be performed on an ECU or MCU. Computing system 204 (or perception and understanding module 203) described herein may be any suitable computing device and software implemented therein. FIG. 3 is a block diagram of an example computing device 300.

Computing device 300 includes a processor 314 and a memory device 318. The processor 314 is coupled to the memory device 318 via a system bus 320. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, the memory device 318 includes one or more devices that enable information, such as executable instructions or other data, to be stored and retrieved. Moreover, the memory device 318 includes one or more computer readable media, such as, without limitation, dynamic random access memory (DRAM), static random access memory (SRAM), a solid state disk, or a hard disk. In the example embodiment, the memory device 318 stores, without limitation, application source code, application object code, configuration data, additional input events, application states, assertion statements, validation results, a hierarchical representation tree including various nodes and sub-nodes, or any other type of data. The computing device 300, in the example embodiment, may also include a communication interface 330 that is coupled to the processor 314 via system bus 320. Moreover, the communication interface 330 is communicatively coupled to data acquisition devices.

In the example embodiment, processor 314 may be programmed by encoding an operation using one or more executable instructions and providing the executable instructions in the memory device 318. In the example embodiment, the processor 314 is programmed to select a plurality of measurements that are received from data acquisition devices.

In operation, a computer executes computer-executable instructions embodied in one or more computer-executable components stored on one or more computer-readable media to implement aspects of the invention described or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 4A:
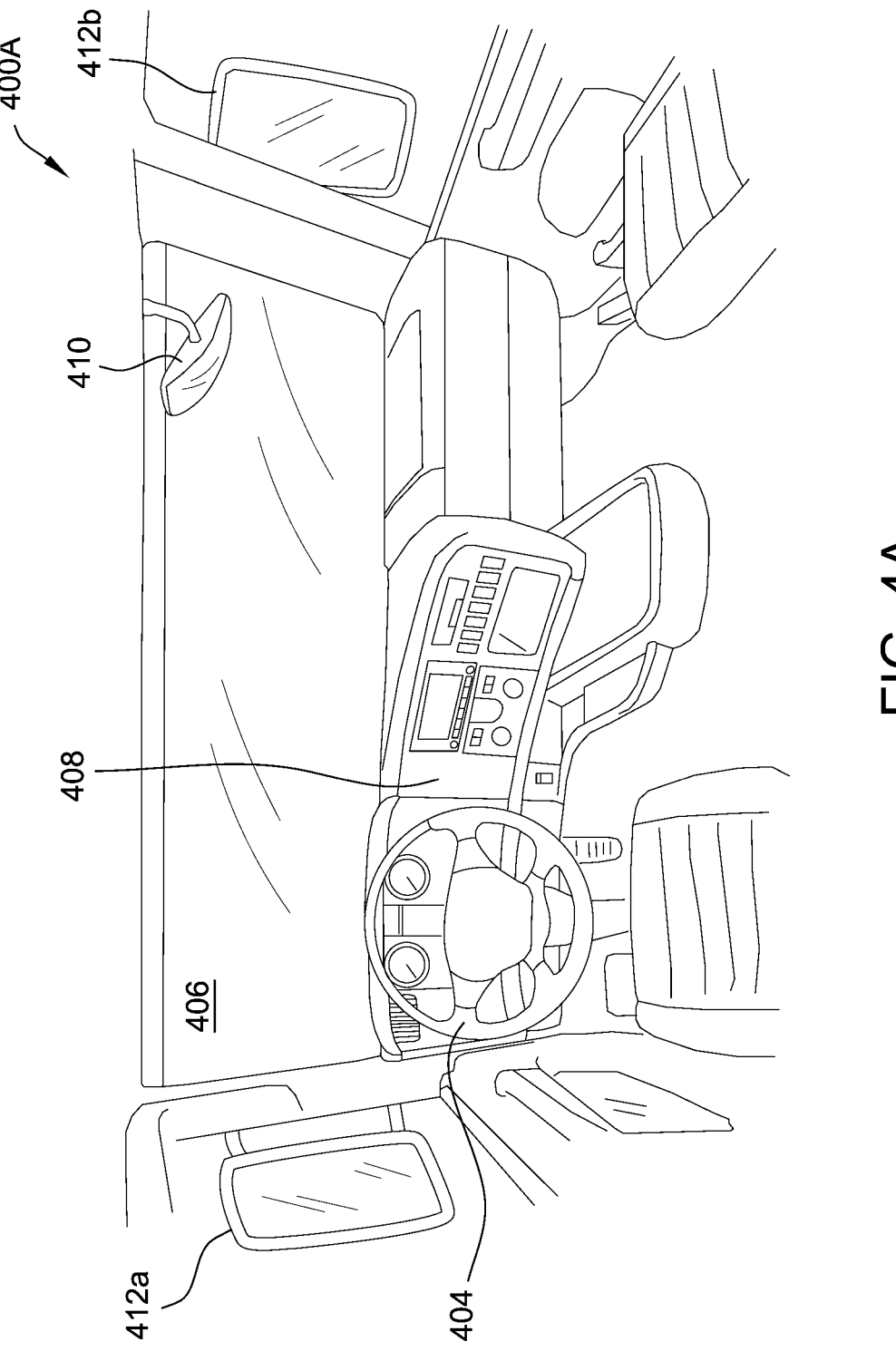
FIGS. 4A-4C illustrate example views from an interior of a vehicle.

FIG. 4A illustrates an example view 400A from an interior of a vehicle. The vehicle may be any vehicle such as a car, truck, etc. As shown in the view 400a, a steering wheel 404, a windshield 406, a dashboard 408, a rearview mirror 410, and sideview mirrors 412a and 412b are shown. The windshield 406 is a conventional windshield, and, therefore, in adverse weather conditions including, but not limited to, fog and rain, etc., or poor lighting conditions, the driver may have poor visibility through the windshield 406.

Figure 4B:
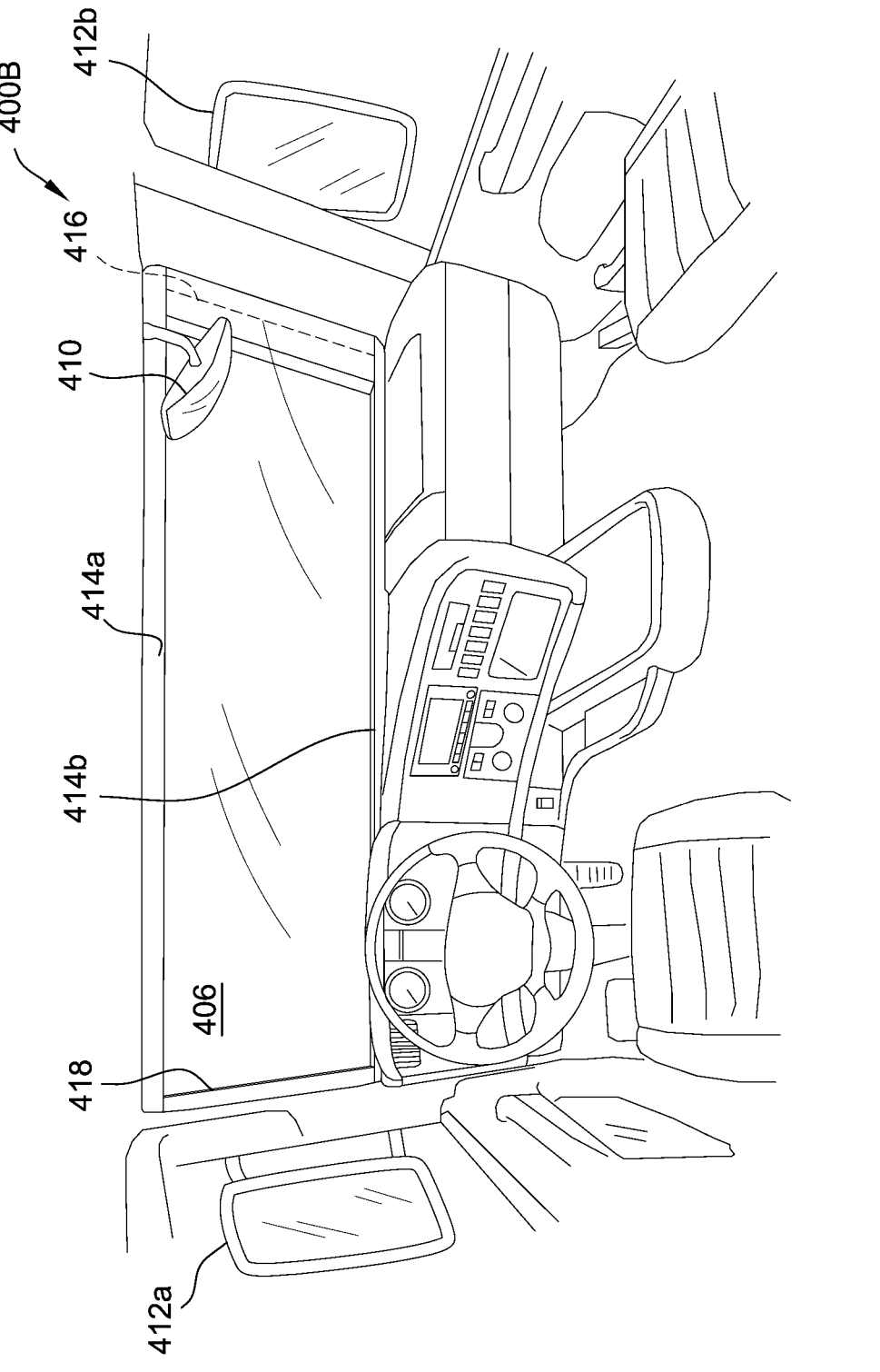

FIG. 4B illustrates an example view 400B from the interior of the vehicle, which shows a flexible display screen storage tube 416 and a flexible display screen attachment component 418. The flexible display screen storage tube 416 stores a flexible display screen 420 while not in use, in particular, when the weather conditions are good and lighting conditions are proper such that the driver has better visibility through the windshield 406. The flexible display screen 420 may be pulled to slide across the windshield 406 via a first channel 414*a* and a second channel 414*b* along the top edge and the bottom edge of the windshield 406, respectively. The flexible display screen storage tube 416 and the flexible display screen attachment component 418 may be positioned on the right edge and left edge of the windshield 406, or vice versa. By way of a non-limiting example, in some embodiments, a flexible display screen may be stored in a flexible display screen storage tube which may be located on the top edge of the windshield and the flexible display screen may be pulled down via the first channel and the second channel positioned along the right and left edges of the windshield to attach with a flexible display screen attachment component positioned at the bottom edge of the windshield.

Figure 4C:
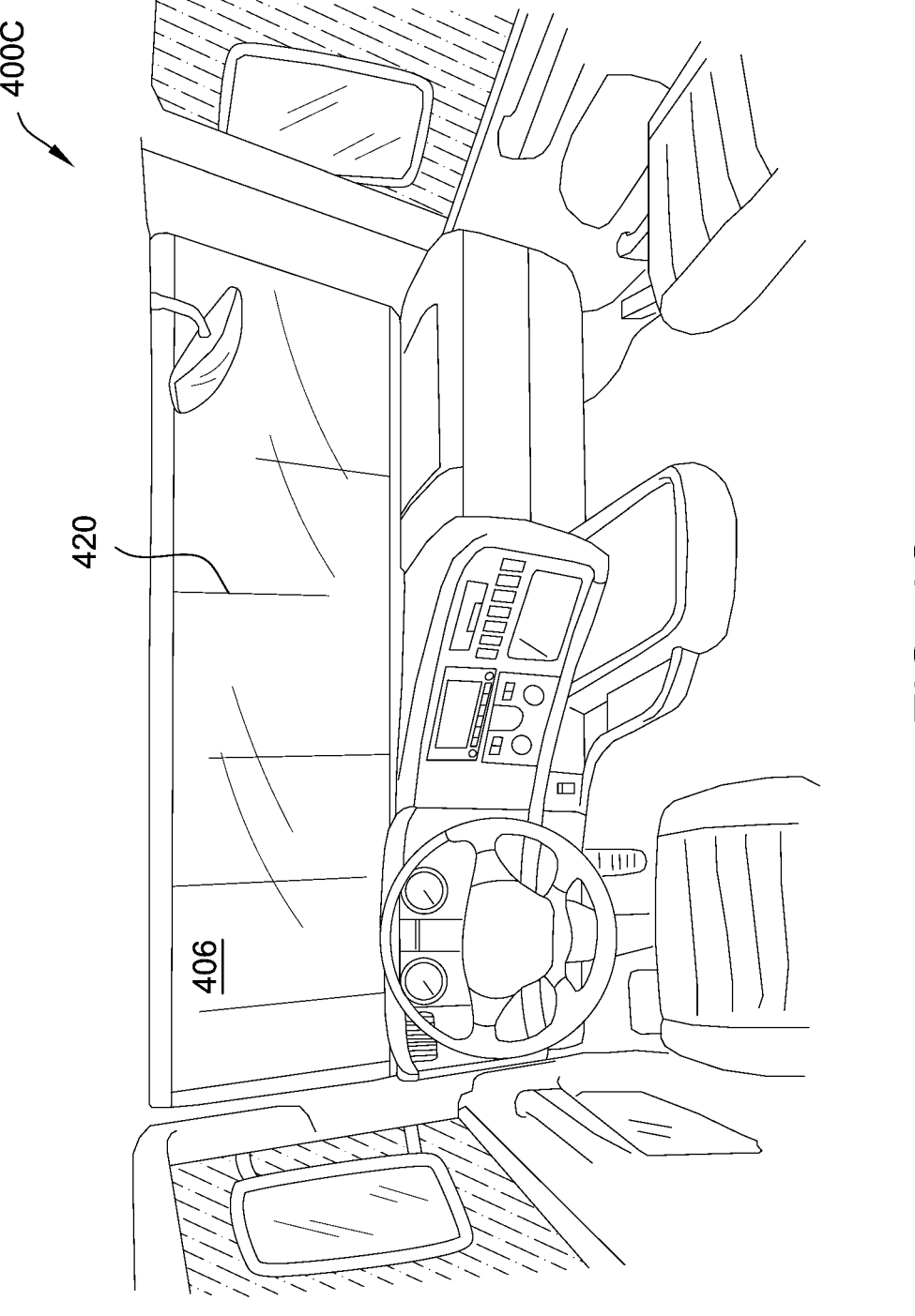

FIG. 4C illustrates an example view 400C from the interior of the vehicle when the lighting conditions are poor or when the weather condition is adverse due to fog or rain, etc. As shown in the view 400*c*, under adverse weather conditions or poor lighting conditions, the driver may have poor visibility through the windshield 406, and, therefore, the driver may prefer to have better visibility through the flexible display screen 420. The driver may release the flexible display screen 420 from the flexible display screen storage tube 416 and pull the flexible display screen 420 up to the flexible display screen attachment component 418 to securely attach the flexible display screen 420 at the flexible display screen attachment component 418. By way of a non-limiting example, the flexible display screen 420 may have an edge having magnetic force to get attached to the flexible display screen attachment component 418. The set or series of images, generated as described herein in which effects of adverse weather conditions or poor lighting are removed, is then shown on the flexible display screen 420 for improved visibility for the driver to operate the car under adverse weather conditions or poor lighting conditions.

FIG. 5 is a flow-chart 500 of an example method performed, for example, by an ECU or MCU of a vehicle or the computing system 204 (shown in FIG. 2) of the vehicle. The method may include receiving 502 sensor data from one or more sensors mounted on a body of the vehicle. By way of a non-limiting example, the one or more sensors mounted on the body of the vehicle include one or more cameras, one or more RADAR sensors, one or more LiDAR sensors, one or more microphones, or one or more infrared sensors, etc. Further, a respective position of each of the one or more sensors mounted on the body of the vehicle may be adjusted to collect sensor data for a first view area in a horizontal direction, and a second view area in a vertical direction. As described herein, the first view area may include 200-220° in the horizontal direction, the second view area may include 60° above a straight line of sight for a driver in the vertical direction or 75° below a straight line of sight for a driver in the vertical direction.

The method may include generating 504 a set of images from the sensor data. The generated set of images may have effects of adverse weather conditions or poor lighting conditions removed, as described herein, using the framework that uses unsupervised machine-learning models for reducing domain feature discrepancies in both image style and object appearance. The framework may also use CNN for facilitating domain adaption.

The method may include displaying 506 the set of images on a flexible display screen attached to a flexible display screen attachment component while covering a windshield of the vehicle. The flexible display screen may be stored in a flexible display screen storage tube when not in use. The flexible display screen storage tube may be positioned along any edge of a windshield of the vehicle and the flexible display screen attachment component may be position along an opposite edge of the windshield where the flexible display screen storage tube is positioned.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A vehicle, comprising:
a windshield being transparent to light;
a flexible display screen configured to cover at least a majority of the windshield;
a flexible display screen attachment component;
at least one processor; and
at least one memory configured to store instructions, which, when executed by the at least one processor, cause the at least one processor to:
generate a set of images from sensor data received from one or more sensors mounted on a body of the vehicle; and
display the set of images on the flexible display screen attached to the flexible display screen attachment component while the flexible display screen covers at least the majority of the windshield,
wherein the set of images has effects of improving visibility in at least one of adverse weather conditions or poor lighting conditions by being displayed on the flexible display screen covering at least the majority of the windshield.

2. The vehicle of claim 1, further comprising a first channel and a second channel along a top edge and a bottom edge of the windshield, respectively.

3. The vehicle of claim 1, further comprising a first channel and a second channel along a right edge and a left edge of the windshield, respectively.

4. The vehicle of claim 1, further comprising a flexible display screen storage tube configured to store the flexible display screen, and wherein the flexible display screen storage tube configured to store the flexible display screen is positioned along a right edge of the windshield and the flexible display screen attachment component is positioned along a left edge of the windshield.

5. The vehicle of claim 1, further comprising a flexible display screen storage tube configured to store the flexible display screen, and wherein the flexible display screen storage tube configured to store the flexible display screen is positioned along a left edge of the windshield and the flexible display screen attachment component is positioned along a right edge of the windshield.

6. The vehicle of claim 1, wherein the one or more sensors mounted on the body of the vehicle include one or more cameras, one or more radio detection and ranging (RADAR) sensors, one or more light detection and ranging (LiDAR) sensors, one or more microphones, or one or more infrared sensors.

7. The vehicle of claim 1, wherein the instructions further cause the at least one processor to adjust a respective position of the one or more sensors mounted on the body of the vehicle to collect sensor data for a first view area in a horizontal direction, and a second view area in a vertical direction.

8. The vehicle of claim 7, wherein the first view area includes 200-220° in the horizontal direction.

9. The vehicle of claim 7, wherein the second view area includes 60° above a straight line of sight for a driver in the vertical direction.

10. The vehicle of claim 7, wherein the second view area includes 75° below a straight line of sight for a driver in the vertical direction.

11. A computer-implemented method, comprising:

receiving sensor data from one or more sensors mounted on a body of a vehicle;

generating a set of images from the sensor data, the set of images has effects of improving visibility in at least one of adverse weather conditions or poor lighting conditions; and displaying the set of images on a flexible display screen attached to a flexible display screen attachment component while covering at least a majority of a windshield of the vehicle, the windshield being transparent to light.

12. The computer-implemented method of claim 11, wherein the flexible display screen is configured to cover the windshield by sliding across a first channel and a second channel along a top edge and a bottom edge of the windshield, respectively.

13. The computer-implemented method of claim 11, wherein the flexible display screen is configured to cover the windshield by sliding across a first channel and a second channel along a right edge and a left edge of the windshield, respectively.

14. The computer-implemented method of claim 11, wherein the flexible display screen is stored in a flexible display screen storage tube when not in use and the flexible display screen storage tube is positioned along a right edge of the windshield and the flexible display screen attachment component is positioned along a left edge of the windshield.

15. The computer-implemented method of claim 11, wherein the flexible display screen is stored in a flexible display screen storage tube when not in use and the flexible display screen storage tube is positioned along a left edge of the windshield and the flexible display screen attachment component is positioned along a right edge of the windshield.

16. The computer-implemented method of claim 11, wherein the one or more sensors mounted on the body of the vehicle include one or more cameras, one or more radio detection and ranging (RADAR) sensors, one or more light detection and ranging (LiDAR) sensors, one or more microphones, or one or more infrared sensors.

17. The computer-implemented method of claim 11, further comprising adjusting a respective position of the one or more sensors mounted on the body of the vehicle to collect sensor data for a first view area in a horizontal direction, and a second view area in a vertical direction.

18. The computer-implemented method of claim 17, wherein the first view area includes 200-220° in the horizontal direction.

19. The computer-implemented method of claim 17, wherein the second view area includes 60° above a straight line of sight for a driver in the vertical direction.

20. The computer-implemented method of claim 17, wherein the second view area includes 75° below a straight line of sight for a driver in the vertical direction.

* * * * *